F. I. & B. P. REMY & A. BERGER.
LIQUID GAGE.
APPLICATION FILED JAN. 10, 1916.
1,281,658.
Patented Oct. 15, 1918.
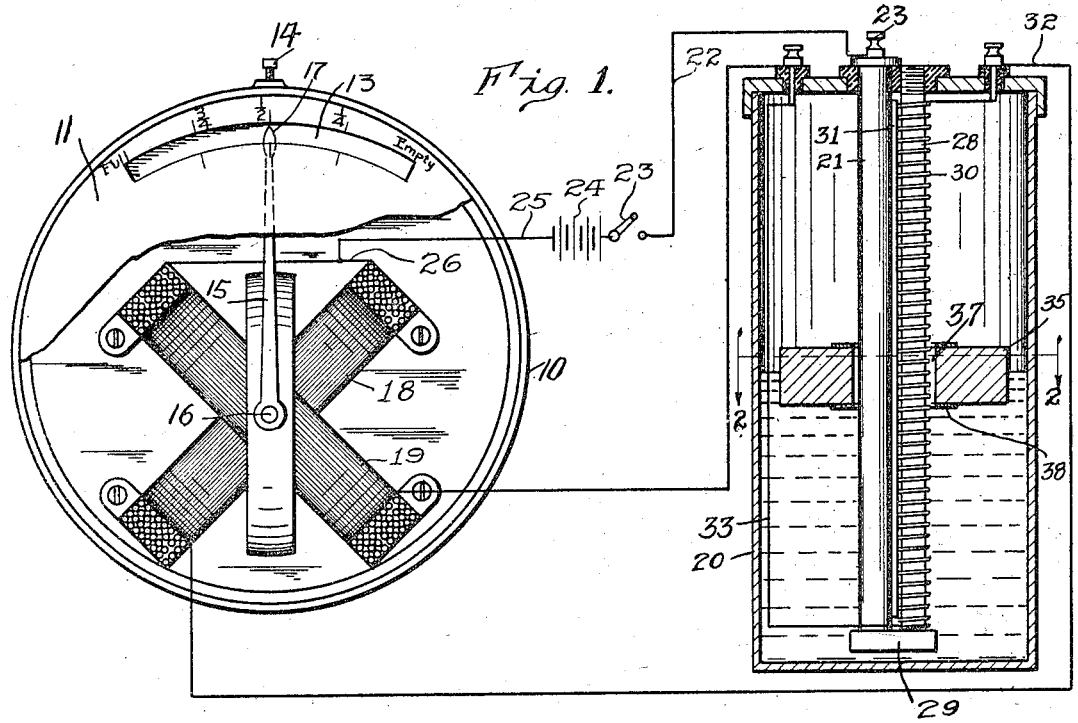
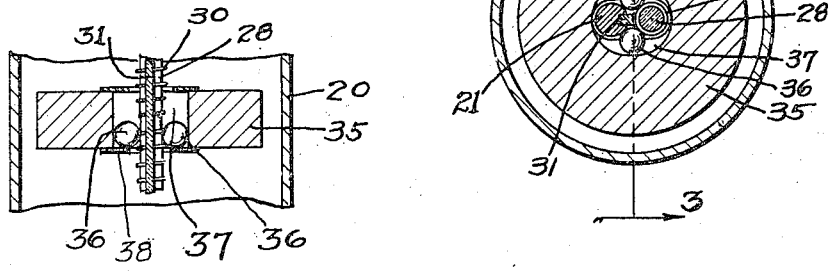
WITNESSES:
INVENTORS.
FRANK I. REMY
BENJAMIN P. REMY and
ARTHUR BERGER
BY
ATTORNEY

UNITED STATES PATENT OFFICE.

FRANK I. REMY AND BENJAMIN P. REMY, OF INDIANAPOLIS, AND ARTHUR BERGER, OF ANDERSON, INDIANA, ASSIGNORS TO REMY BROTHERS COMPANY, OF ANDERSON, INDIANA, A COPARTNERSHIP.

LIQUID-GAGE.

1,281,658.   Specification of Letters Patent.   Patented Oct. 15, 1918.

Application filed January 10, 1916.  Serial No. 71,335.

*To all whom it may concern:*

Be it known that we, FRANK I. REMY, BENJAMIN P. REMY, and ARTHUR BERGER, citizens of the United States, and residents of Indianapolis and Anderson, counties of Marion and Madison, and State of Indiana, have invented a certain new and useful Liquid-Gage; and we do hereby declare that the following is a full, clear, and exact description thereof, reference being had to the accompanying drawings, in which like letters refer to like parts.

The object of this invention is to improve the means for indicating the quantity of liquid in a tank so that the gage will be reliable. Another object is to have an arrangement whereby the indicator may be located at some distance from the tank so as to make the device convenient for mounting in an automobile. Another object is to have such an electrical device that it will automatically compensate for changes in temperature and changes in the battery strength. Another object is to render the device readily adaptable for tanks of varying depths, with a minimum amount of change in installation.

The chief feature of this invention consists in such an arrangement of means for controlling the action of the galvanometer according to the quantity of liquid in the tank as to render needless any resistance outside of the tank. It also makes it needless to employ any means to maintain a constant electro-motive force. This is accomplished by providing a resistance unit in the tank connected with one end of the coils in the galvanometer and located beside a conductor in the tank having practically no resistance and electrically connected with the other ends of the coils in the galvanometer. A float in the tank electrically connects the non-resistance means and the resistance coil in the tank at the surface of the fluid and thus varies the resistance.

The full nature of the invention will be understood from the accompanying drawings and the following description and claims.

In the drawings, Figure 1 is an illustration of the invention showing the gage in elevation with a portion of the front plate broken away, the fluid tank in vertical central section and the electrical connections diagrammatic. Fig. 2 is a section on the line 2—2 of Fig. 1. Fig. 3 is a section through a part of the device on the line 3—3 of Fig. 2.

There is shown in Fig. 1 a gage casing 10 having a removable front plate 11 angularly adjustable in said casing and secured in adjusted position by a set screw 14. In said plate 11 there is a curved slot 13 adjacent which there are graduation marks and numerals indicating the contents of the tank. The angular adjustment referred to is to enable said graduations to be adjusted to suit varying conditions of the remainder of the device and so that said graduations will correctly indicate the contents of the tank.

Within the casing 10 there is a pair of coils 18 and 19 secured to the back wall of the casing and concentric with each other. The axes of the two coils are approximately at 90 degree angles to each other. A needle bar 15 is centrally fulcrumed on a rod 16 mounted in the center of said coils so that the similar poles of said two coils will correspondingly influence said needle according to the magnetic influence in each of said coils. A pointer 17 of the needle approaches to and moves along the slot 13 in order to indicate the fluid contents of the tank. The coils 18 and 19 are in a divided circuit so that when current is passed through them there will be a resultant north and south pole line substantially in the direction of the needle 15. The direction of this north and south pole line will depend upon the strength of the current passing through each coil and the needle will take a position in line with such north and south pole line.

The fluid tank 20 has mounted in it centrally and vertically a non-resistance rod or conductor 21 and insulated from the tank and connected at its upper end by lines 22 with a switch or push button 23, battery 24, lines 25 and 26 connecting with one end of each of the coils 18 and 19 in a gage or galvanometer.

There is also mounted within the tank a non-conducting rod 28 parallel with the conducting rod 21 and insulated from the tank. The lower ends of both of said rods 21 and 28 are mounted in a non-conducting block 29. A resistance coil 30 surrounds spirally said non-conducting rod 18 and is insulated from the rod 21 by an insulating strip 31 extending from end to end. The upper end of the resistance coil 30 is connected by a line 32 with the lower ends of the coil 18 in the galvanometer, while the lower end of the resistance coil 30 is connected by a wire 33 with the lower end of the coil 19 in the galvanometer.

Within the tank 20 there is a float 35 adapted to move vertically along the rods 21 and 28 and resistance coil 30 according to the quantity of fluid in the tank and also to electrically connect said rod 21 with the resistance coil at substantially the top of the fluid and thus divide the resistance in said resistance unit according to the quantity of fluid in the tank. This electrical connection is accomplished by means of metal balls 36 which lie on the opposite sides of the insulating strip 31 and between the bars 21 and 28 and within a central opening 37 in the float and are supported loosely in said situation by the ball supports 38 extending down from the lower side of the float. Therefore, the balls are always held in electrical contact with rod 21 and bar 30 at the fluid level and readily moved up or down with the float.

The operation of the device is as follows: When the switch or push button 23 is closed, the circuit from the battery enters the non-resistance rod or conductor 21 and crosses the connection in the float and divides in the resistance coil 30, part going toward the upper end and part toward the lower end and then to the respective coils 18 and 19 in the galvanometer and back to the battery. If the tank be empty the float will be at the bottom and there will be practically no resistance upon the part of the coil which comes from the end of the resistance unit in the tank, but all of the resistance would be through the upper end and consequently the magnetic influence on the coil 19 would be much greater than on the coil 18, thus causing the indicating needle to point to the word "Empty". If the tank should be substantially half full, as shown, the two ends of the resistance coil would be of equal strength and, therefore the magnetic influence of the coils 18 and 19 would be equal and the indicator would be at the midway point.

Thus the indicator would be modified in accordance with the position of the float and the quantity of the fluid in the tank, from full to empty. Thus it is seen that the device is reliable and the indicator can be located at considerable distance from the tank and changes in temperature or battery strength do not affect its reliability and by manufacturing the portion for the tank long enough for long tanks the same can be readily shortened or cut off to suit the depth of smaller tanks while installing this device.

The invention claimed is:

1. A device of the kind described including an electrically operated gage with coils therein, a liquid tank, a conducting rod in said tank and connected with one end of the coils in the gage, a resistance coil in said tank parallel with and insulated from said conducting rod and with its ends electrically connected with the other ends of the respective coils in the gage, a float in said tank and spherical members floatably positioned in said float and adapted to electrically connect said conducting rod and resistance coil.

2. A device of the kind described including an electrically operated gage with coils therein, a liquid tank, a conducting rod extending vertically in said tank and connected with one end of the coils in the gage, a non-conducting rod in said tank parallel with said conducting rod, a resistance coil surrounding said non-conducting rod and with its ends electrically connected with the other ends of the respective coils in the gage, and a float surrounding said rods and resistance coil in the tank and electrically connecting the conducting rod and resistance coil therein.

3. A device of the kind described including an electrically operated gage with coils therein, a liquid tank, a conducting rod extending vertically in said tank and connected with one end of the coils in the gage, a non-conducting rod in said tank parallel with said conducting rod, a resistance coil surrounding said non-conducting rod and with its ends electrically connected with the other ends of the respective coils in the gage, a strip of insulation secured to said conducting rod and between it and the resistance coil, and a float surrounding said rods and resistance coil in the tank and electrically connecting the conducting rod and resistance coil therein.

4. A device of the kind described including an electrically operated gage with coils therein, a liquid tank, a conducting rod extending vertically in said tank and connected with one end of the coils in the gage, a non-conducting rod in said tank parallel with said conducting rod, a resistance coil surrounding said non-conducting rod and with its ends electrically connected with the other ends of the respective coils in the gage, said conducting rod and insulating rod being supported from the top of the tank and with their lower ends separated from the bottom of the tank, an insulating block secured to the lower ends of said rods, and a float surrounding said rods and resistance coil in the tank and electrically connecting the conducting rod and resistance coil therein.

5. A device of the kind described including an electrically operated gage with coils therein, a liquid tank, a conducting rod extending vertically in said tank and connected with one end of the coils in the gage, a non-conducting rod in said tank parallel with said conducting rod, a resistance coil surrounding said non-conducting rod and with its ends electrically connected with the other ends of the respective coils in the gage, a float in said tank having a central opening loosely surrounding said conducting rod and coil, metallic balls in said opening in the float and each ball engaging said conducting rod and resistance coil, and means connected with the float for loosely supporting said balls.

In witness whereof we have hereunto affixed our signatures.

FRANK I, REMY.
BENJAMIN P. REMY.
ARTHUR BERGER.